(12) United States Patent
Barberger et al.

(10) Patent No.: US 12,503,975 B1
(45) Date of Patent: Dec. 23, 2025

(54) HOUSING ASSEMBLY FOR ROTARY ENGINE AND METHOD OF MANUFACTURING THEREOF

(71) Applicant: PRATT & WHITNEY CANADA CORP., Longueuil (CA)

(72) Inventors: Jeremie Barberger, Longueuil (CA); Michel Bousquet, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/887,191

(22) Filed: Sep. 17, 2024

(51) Int. Cl.
| | |
|---|---|
| *F02B 55/08* | (2006.01) |
| *F01C 19/00* | (2006.01) |
| *F02B 53/00* | (2006.01) |
| *F02B 77/02* | (2006.01) |

(52) U.S. Cl.
CPC .............. *F02B 55/08* (2013.01); *F01C 19/00* (2013.01); *F02B 77/02* (2013.01); *F02B 2053/005* (2013.01)

(58) Field of Classification Search
CPC .... F02B 55/08; F02B 77/02; F02B 2053/005; F01C 19/00
See application file for complete search history.

(56) References Cited

U.S. PATENT DOCUMENTS

| | | | |
|---|---|---|---|
| 3,394,877 A * | 7/1968 | Hantzsche | F02B 53/00 418/179 |
| 3,799,706 A | 3/1974 | Bilobran | |
| 4,633,829 A | 1/1987 | Kollen | |
| 9,896,934 B2 | 2/2018 | Villeneuve et al. | |
| 11,333,068 B1 | 5/2022 | Savaria et al. | |
| 11,761,376 B1 | 9/2023 | Vinski et al. | |

* cited by examiner

*Primary Examiner* — Audrey B. Walter
(74) *Attorney, Agent, or Firm* — NORTON ROSE FULBRIGHT CANADA LLP

(57) ABSTRACT

A method of manufacturing a component of a housing defining a rotor cavity, the method includes: obtaining a body of the component of the housing, the body having a first face and a second face opposite to the first face, the second face facing away from the rotor cavity, the body made of a first material; performing a treatment to the body to increase a wear-resistance of the first material; depositing a bonding layer on the second face of the body, the bonding layer including a second material being dissimilar from the first material, the first material being more wear-resistant than the second material, the second material defining an exposed face of the bonding layer facing away from the body; and completing a shape of the body by bonding a quantity of a third material to the exposed face of the bonding layer.

11 Claims, 7 Drawing Sheets

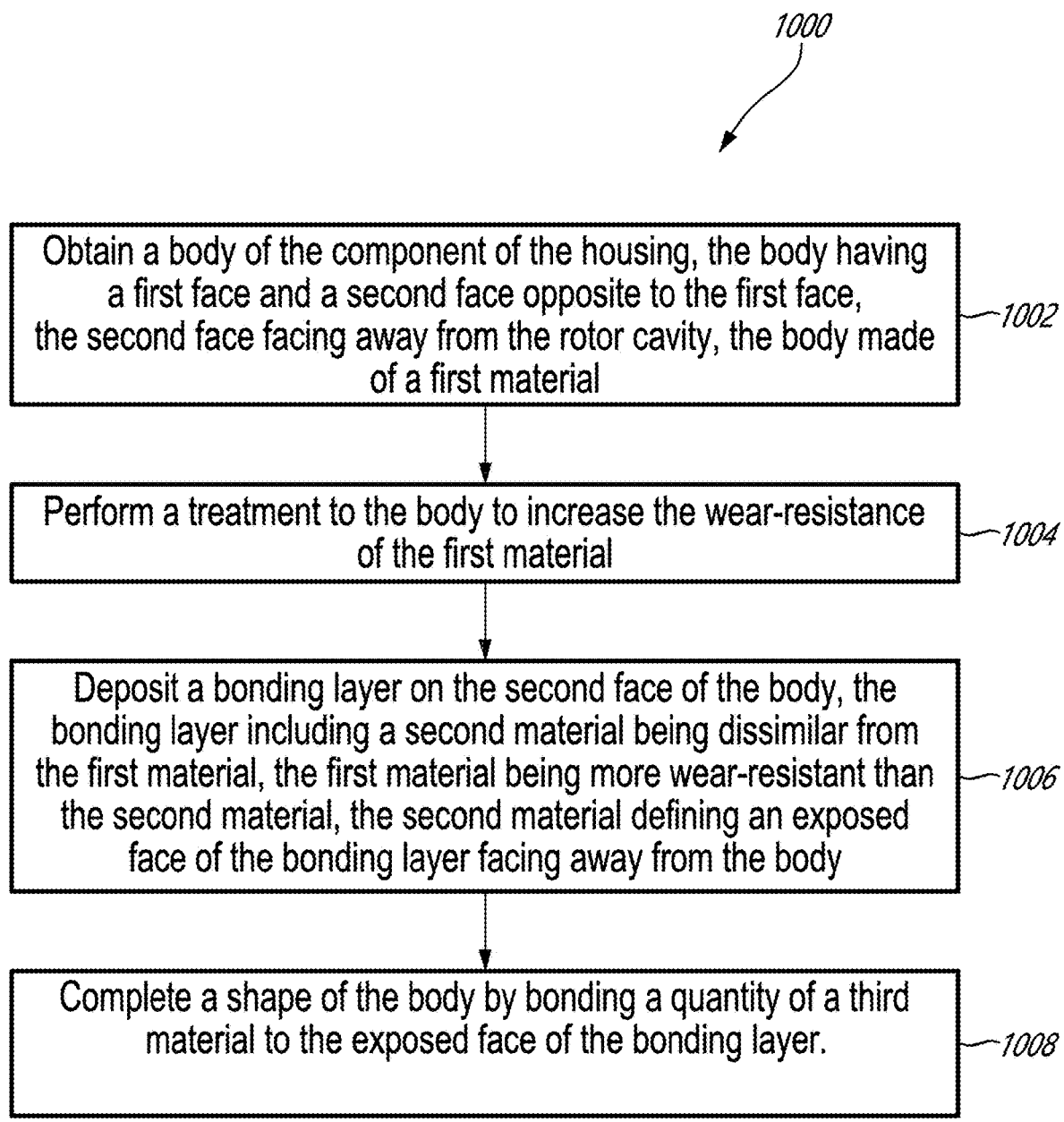

HOUSING ASSEMBLY FOR ROTARY ENGINE AND METHOD OF MANUFACTURING THEREOF

TECHNICAL FIELD

The application relates generally to aircraft engines and, more particularly, to rotary internal combustion engines.

BACKGROUND

Combustion chambers of a rotary engine, such as a Wankel engine, are delimited radially by the rotor and a rotor housing and axially by one or more side housings. These housings have faces oriented toward the combustion chambers and are, thus, subjected to high pressure and thermal loads. On the other hand, the housings provide running surfaces for side seals of the rotor. Improvements are always desirable in this technology area.

SUMMARY

In one aspect, there is provided a method of manufacturing a component of a housing defining a rotor cavity for receiving a rotor of a rotary internal combustion engine, the method comprising: obtaining a body of the component of the housing, the body having a first face and a second face opposite to the first face, the second face facing away from the rotor cavity, the body made of a first material; performing a treatment to the body to increase a wear-resistance of the first material; depositing a bonding layer on the second face of the body, the bonding layer including a second material being dissimilar from the first material, the first material being more wear-resistant than the second material, the second material defining an exposed face of the bonding layer facing away from the body; and completing a shape of the body by bonding a quantity of a third material to the exposed face of the bonding layer.

The method described above may include any of the following features, in any combinations.

In some embodiments, the bonding of the quantity of the third material includes bonding the quantity of the third material with one or more of additive manufacturing and casting.

In some embodiments, the depositing of the bonding layer includes depositing the bonding layer with ultrasonic additive manufacturing.

In some embodiments, the performing of the treatment includes one or more of: performing a heat treatment to the body; performing a surface treatment to the first face of the body; and depositing a hard coating on the first face of the body.

In some embodiments, the depositing of the hard coating includes deposing the hard coating including one or more of silicon carbide, chromium carbide, aluminum nitride, and tungsten carbide.

In some embodiments, the performing of the surface treatment includes performing one or more of laser hardening, shot peening, and thermal spraying.

In some embodiments, the obtaining of the body includes obtaining the body made of one or more of steel, cast iron, tungsten carbide, and silicon carbide.

In some embodiments, the bonding of the quantity of the third material includes bonding aluminum to the third material via the bonding layer.

In some embodiments, the method includes performing finishing steps to the third material after the bonding of the quantity of the third material.

In some embodiments, the component is a side plate, the obtaining of the body includes obtaining two bodies made of the first material, the depositing of the bonding layer includes depositing a bonding layer on both of the two bodies, the bonding of the quantity of the third material includes bonding the quantity of the third material on both of the two bodies to obtain two sections of the side plate, and joining the two sections together to obtain the side plate.

In some embodiments, the third material is the same as the second material.

In another aspect, there is provided a housing assembly for a rotary internal combustion engine, comprising: a rotor housing extending around an axis, the rotor housing having a peripheral inner face facing a rotor cavity and a face intersecting the peripheral inner face; a side housing secured to the rotor housing, the side housing defining an inner side face facing the rotor cavity and facing the rotor housing; and one or more of the rotor housing and the side housing having: a main body made of a base material; a bounding layer including the base material at an interface with the main body; and an external layer made of an external material, the external layer secured to the main body via the bounding layer, the base material and the external material being dissimilar to one another, a wear-resistance of the external material greater than that of the base material, the external layer defining at least a part of one or more of the face of the rotor housing, the peripheral inner face of the rotor housing, and the inner side face of the side housing.

The housing assembly described above may include any of the following features, in any combinations.

In some embodiments, the base material is aluminum and the external material is one of steel, cast iron, tungsten carbide, and silicon carbide.

In some embodiments, a thickness of the external layer is at least about 0.010 inch.

In some embodiments, a hard coating is disposed over the external layer on a face facing away from the bounding layer.

In some embodiments, the hard coating includes of one or more of silicon carbide, chromium carbide, aluminum nitride, and tungsten carbide.

In some embodiments, the side housing includes a side wall secured to the rotor housing and a side plate, a peripheral section of the side plate disposed between the side wall and the rotor housing.

In some embodiments, the side plate includes a core made of the base material and two layers of the wear-resistant material secured to opposed faces of the core via respective bounding layers including the base material.

In some embodiments, both of the inner side face and the face are defined by the external material.

In some embodiments, a hard coating is disposed over the side plate.

DESCRIPTION OF THE DRAWINGS

Reference is now made to the accompanying figures in which:

FIG. 10 is a flowchart illustrating steps of a method of manufacturing a housing assembly of the rotary engine.

DETAILED DESCRIPTION

Figure 1:
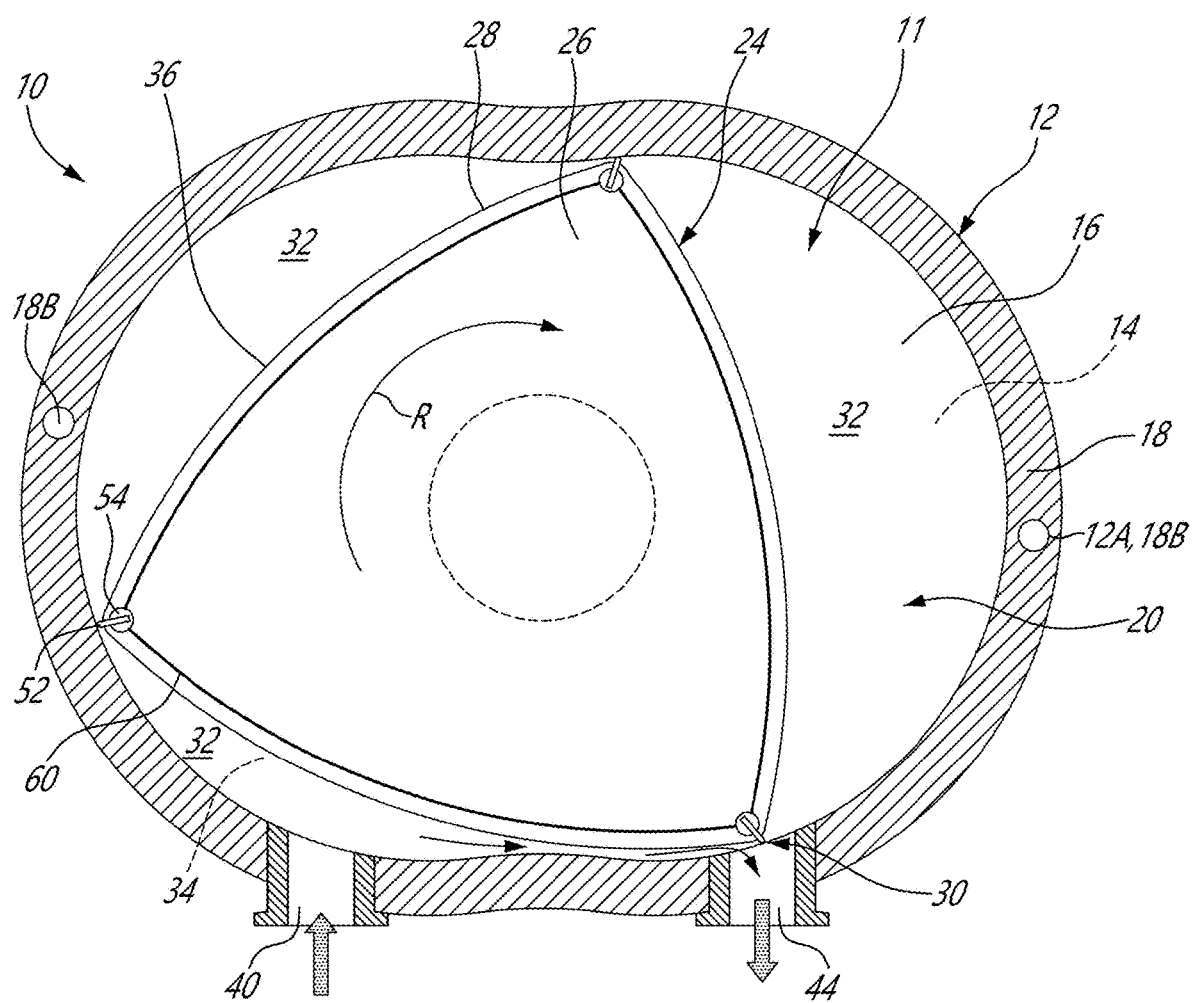
FIG. 1 is a cross-sectional view of a rotary internal combustion engine in accordance with one embodiment.

Referring to FIG. 1, a rotary internal combustion engine, referred to simply as a rotary engine below, which may be a Wankel engine, is schematically shown at 10. The rotary engine 10 comprises an outer body also referred to as a housing assembly 12 having axially-spaced side housings 11, which each includes a side wall 14 and a side plate 16 mounted to the side wall 14, with a rotor housing 18 extending from one of the side housings 11 to the other, to form a rotor cavity 20. The rotor housing 18 has a first side and a second side opposite to the first side. The side housings 11 include a first side housing secured to the first side and a second side housing secured to the second side. The rotor cavity 20 is defined axially between the side housings 11 and circumscribed by the rotor housing 18. In FIG. 1, the side wall 14 is indicated with a dashed line because it sits below the side plate 16. The inner surface of the rotor housing 18 has a profile defining two lobes, which may be an epitrochoid. In some alternate embodiments, the side housings 11 include solely the side wall, that is, the side wall and the side plate may be combined into a single element. In alternative embodiments, the side housings 11 may each include solely a wall secured to a respective side of the rotor housing 18. This wall would define both of abutment faces contacting the rotor housing 18 and running faces contacting a rotor in the rotor cavity 20.

In some embodiments, the housing assembly 12 of the rotary engine 10 may include an intermediate housing in a configuration in which the rotary engine 10 includes two rotors and two rotor housings. The side housings, as intended in this disclosure, may be embodied as end housing or as intermediate housing. Put differently, in a rotary engine including a plurality of rotors, the rotary engine includes a stack of housings. For instance, for a 2-rotor engine, the stack of housing includes: a first end housing, a first rotor housing, an intermediate housing, a second rotor housing, and a second end housing. In such a configuration, each of the first and second rotor housings is disposed between a respective one of the first and second end housings and the intermediate housing. Regardless of a number of rotors, the rotary engine includes only two end housings disposed at opposite ends of the stack of housings. A number of the intermediate housing equals a number of the rotor minus 1 (e.g., one intermediate housing for a two-rotor engine, two intermediate housings for a three-rotor engine, and so on). The different housings are clamped in sandwich. The intermediate housing may include a wall and two side plates.

The housing assembly 12 includes a coolant circuit 12A, which may include a plurality of coolant conduits 18B defined within the rotor housing 18. As shown more clearly in FIG. 5, the coolant conduits 18B extends from one of the side housings 11 to the other. The coolant circuit 12A is used for circulating a coolant, such as water or any suitable coolant, to cool the housing assembly 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending there between. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and housing assembly 12. The combustion chambers 32 vary in volume with rotation of the rotor 24 within the housing assembly 12. The geometrical axis of the rotor 24 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the housing assembly 12 is illustrated. As briefly introduced above, the side housings 11 include the side walls 14 that are secured to the rotor housing 18. Each of the side walls 14 has a portion located proximate an outer perimeter P (FIG. 4) of the side wall 14 and configured to be in abutment against the rotor housing 18 for defining the rotor cavity 20.

In the embodiment shown, each of the side walls 14 is configured to be secured to a respective one of opposed ends of the rotor housing 18. The side housings 11 further include side plates 16 located on inner sides of the side walls 14. The side plates 16 define rotor-engaging faces 16A on which the side seals 60, oil seals, and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16. The side plates 16 may however be entirely made of the hard material, such as silicon carbide. The side plates 16 may be made of aluminum, steel, or any suitable ceramic material.

Figure 4:
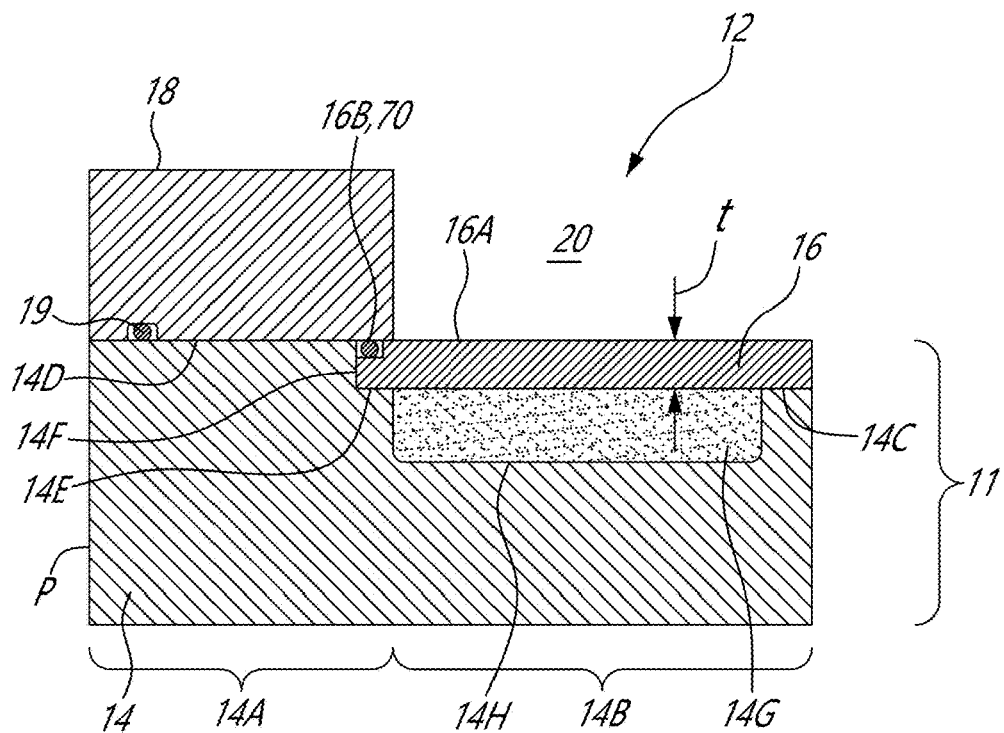
FIG. 4 is a cross-sectional view taken along line B-B of FIG. 2 in accordance with one embodiment.

Referring more particularly to FIG. 4, the side wall 14 includes a peripheral section 14A, which is in abutment with the rotor housing 18, and a center section 14B, which is circumferentially surrounded by the peripheral section 14A. In the disclosed embodiment, the peripheral section 14A of the side wall 14 is secured to the rotor housing 18. The center section 14B of one of the side walls 14 faces the center section 14B of the other of the side walls 14. The side walls 14 are secured to the rotor housing 18 with any suitable means known in the art. As shown, a sealing member 19 is located between the rotor housing 18 and the peripheral sections 14A of the side walls 14 for preventing coolant from leaking out. The sealing member 19 may be an O-ring. The sealing member 19 may be received within an annular recess, which may be defined by one or more of the rotor housing 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the rotor housing 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the rotor housing 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24. The side plate 16 may be supported by a housing in the center to limit the movement of the side plate 16.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the rotor housing 18 and the side wall 14 might be minimized.

To limit axial movements of the side plate 16 relative to the axis of rotation of the rotor 24 (FIG. 1), a periphery of the side plate 16 is contained axially between the rotor housing 18 and the side wall 14. In other words, the periphery of the side plate 16 is sandwiched between the side wall 14 and the rotor housing 18. A seal 70 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the seal 70 is contained within a groove 16B defined by the side plate 16. The seal 70 is described in detail below.

In a particular embodiment, the seal 70 and the abutment surface 14F of the side wall 14 allows the side plate 16 to move radially relative to the side wall 14. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansion.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuit 12A and is in fluid flow communication with the coolant conduits 18B that are defined in the rotor housing 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
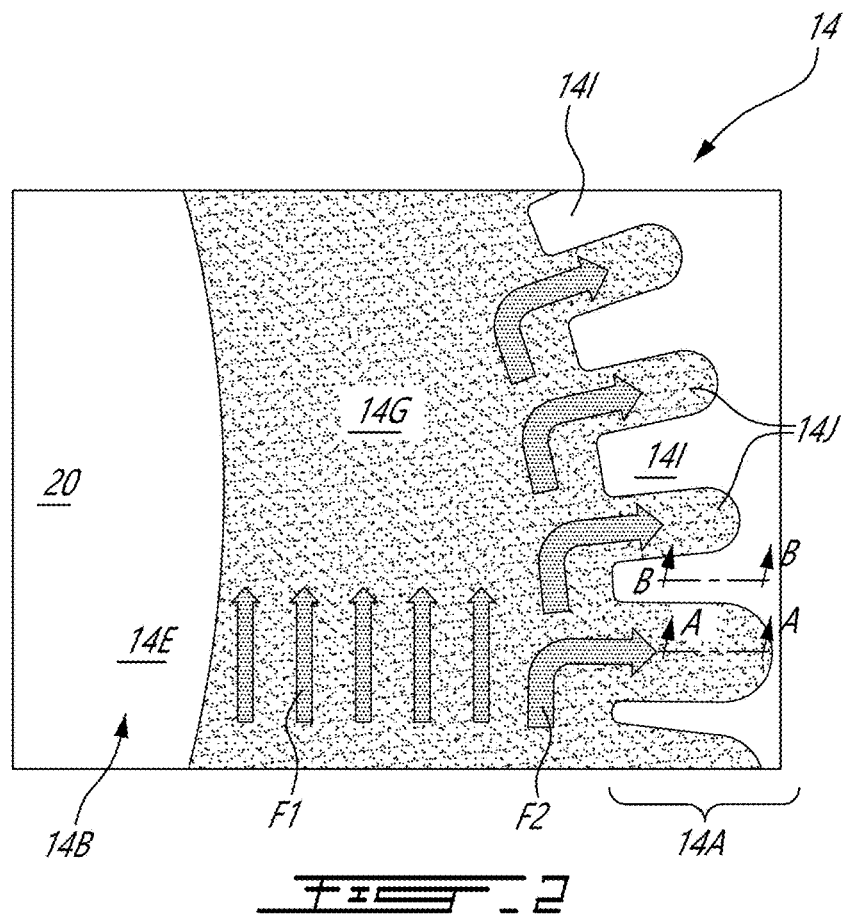
FIG. 2 is a fragmented top view of a side wall of a side housing of the rotary internal combustion engine of FIG. 1.
Figure 3:
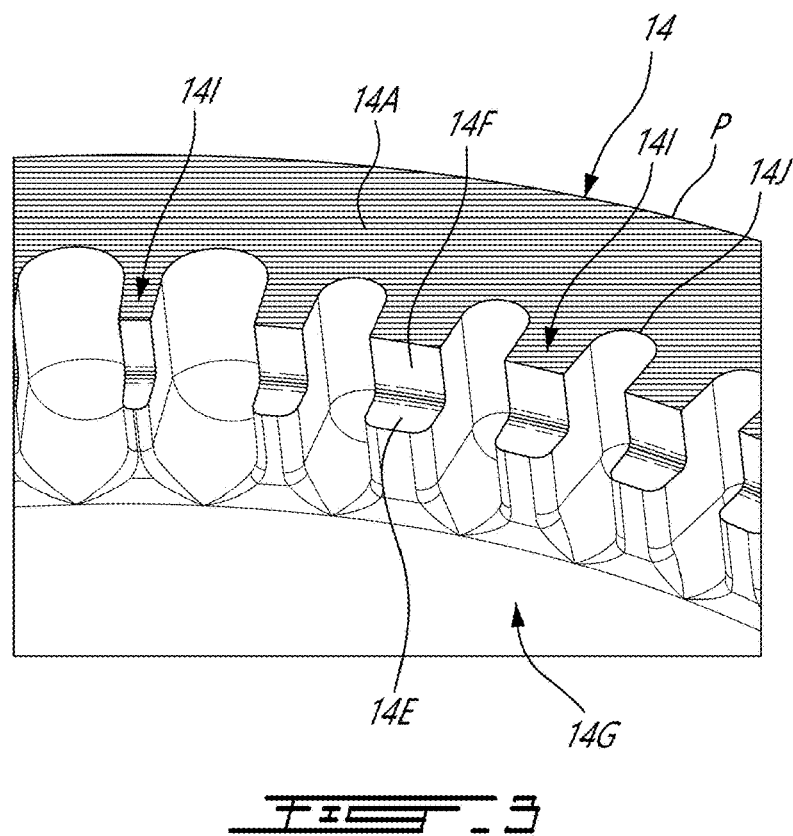
FIG. 3 is a fragmented three-dimensional view of the side housing of FIG. 2.

As shown in FIGS. 2-3, the peripheral section 14A of the side wall 14 defines a plurality of ribs 14I that are circumferentially distributed around the rotor cavity 20. The ribs 14I defines the abutment surface 14F and a portion of the surface 14E of the center section 14B of the side wall 14. Consequently, and in the depicted embodiment, the abutment surface 14F is defined by a plurality of surfaces defined by the ribs 14I. The ribs 14I may be configured to support a pressure load imparted by a combustion of a mixture of air and fuel within the combustion chambers 32.

Cavities or spaces 14J are defined between the ribs 14I. More specifically, each pair of two consecutive ones of the ribs 141 defines a space 14J therebetween. The spaces 14J are in fluid communication with the pocket 14G and with the coolant conduits 18B of the rotor housing 18. Stated otherwise, the coolant conduits 18B are in fluid communication with the pocket 14G via the spaces 14J between the ribs 141. The spaces 14J may allow the liquid coolant to flow from the pocket 14G to the coolant conduits 18B of the rotor housing 18. It is understood that the liquid coolant may be circulated in closed loop and through a heat exchanger. The heat exchanger may be used to dissipate heat to an environment outside the engine; the heat transferred from the engine to the liquid coolant.

Figure 5:
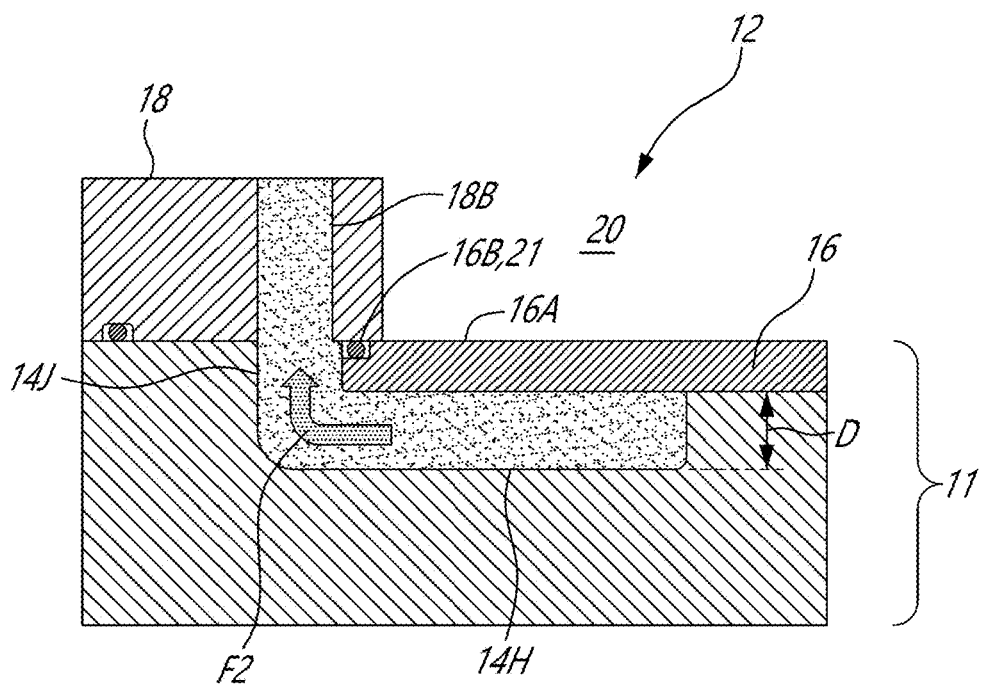
FIG. 5 is a cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuit 12A. The liquid coolant may be circulated out of the housing assembly 12 and within a heat exchanger for extracting the heat. The liquid coolant may then be reinjected in the coolant circuit 12A for further heat extraction.

Figure 6:
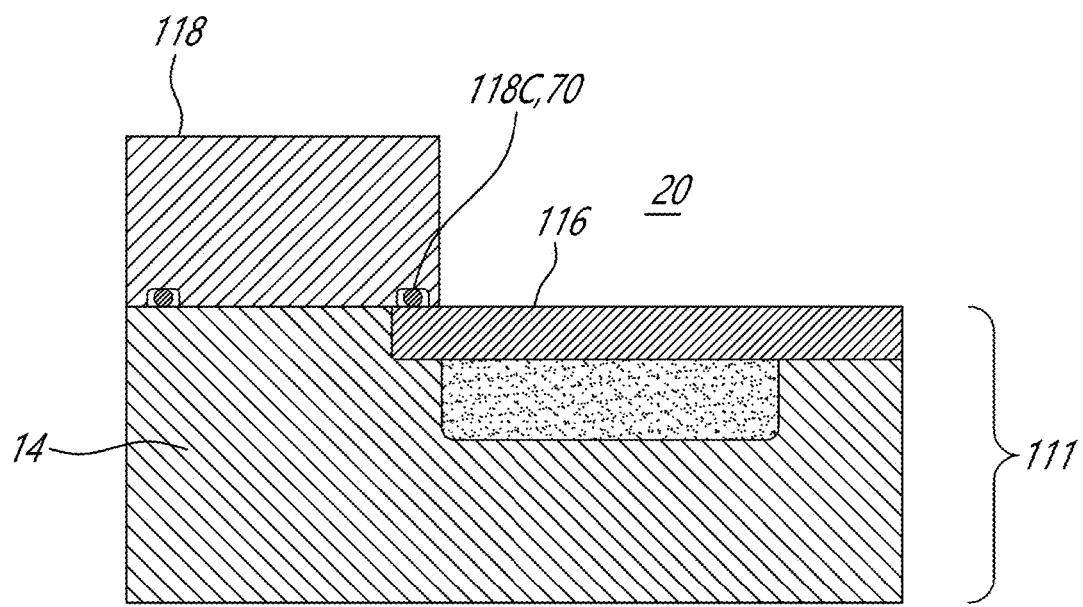
FIG. 6 is a cross-sectional view taken along line B-B of FIG. 2 in accordance with another embodiment.

Referring now to FIG. 6, another embodiment of the outer body, more specifically of the side housing 111 and rotor housing 118, is generally shown. For the sake of conciseness, only elements that differ from the housing assembly 12 of FIGS. 2-5 are described. In the embodiment shown, the rotor housing 118 defines a groove 118C that receives the seal 70.

The housings of these rotary internal combustion engines are subjected to high pressure and thermal loads while having to provide running surface for the rotor. These running surfaces may be required to remain flat and cool to provide optimal sealing and to be of sufficient hardness to minimize wear. A material of choice for the rotor housing and the side housings may be aluminum due to its light weight and high thermal conductivity. However, the running surface of the aluminum housing may not be sufficiently wear-resistant. When using soft material like standard aluminum, the surface between the side and rotor housing is subject to wear and fretting. It may be possible to alleviate this drawback by using a wear resistant aluminum, such as an aluminum-silicon-carbide alloy. However, such a material is difficult to machine.

Moreover, it may be possible to use aluminum for a bulk of the rotary engine and to apply a wear-resistant material over a face of the aluminum to enhance wear-resistance when exposed to combustion gases and contact with the seals or rotor. However, doing so may limit possible treatment to be applied to the wear-resistant material. For instance, a part made of aluminum and a wear-resistant material may not undergo a thermal treatment since a temperature required for such a treatment may be above a melting temperature of the aluminum.

Figure 7:
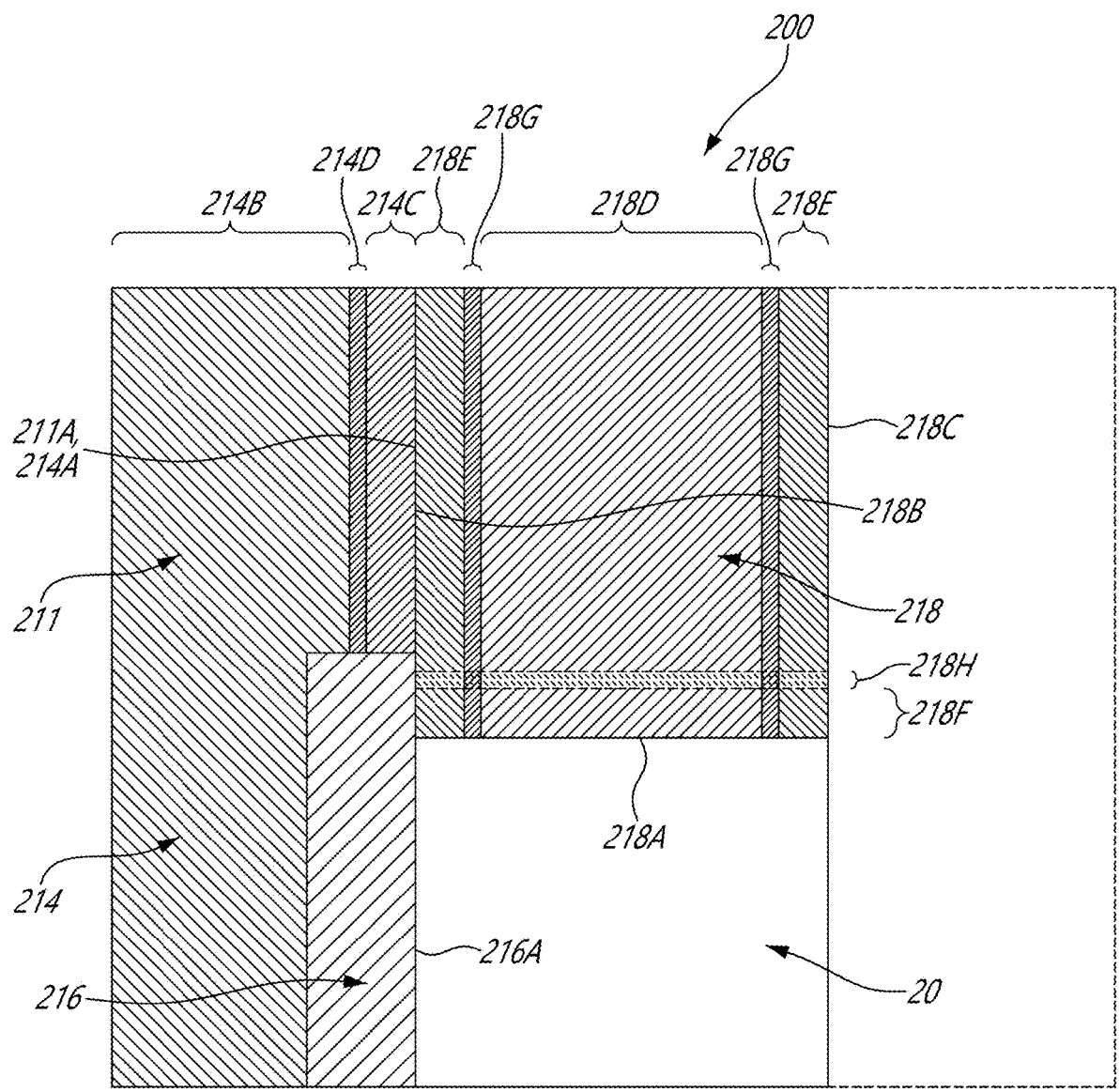
FIG. 7 is a cross-sectional view illustrating a housing assembly in accordance with one embodiment to be used with the rotary engine of FIG. 1.

Referring now to FIG. 7, a possible embodiment of a housing assembly at least partially alleviating the aforementioned drawbacks is shown at 200. The features described below with reference to FIG. 7 may be applied to any of the rotary internal combustion engines described in this disclosure.

As shown in FIG. 7, the rotor housing 218 has a peripheral inner face 218A facing the rotor cavity 20. The rotor housing 218 has a first face 218B at a first side and a second face 218C at a second side opposite to the first side. As previously described, a side housing 211 is secured to the first side of the rotor housing 218. Another side housing (an end housing or an intermediate housing), depicted in dashed lines in FIG. 7, is secured to the second side of the rotor housing 218. The side housing 211 defines an inner side face 211A that faces the rotor cavity 20 and the rotor housing 218. In this embodiment, the inner side face 211A is defined in part by a side wall 214 and in part by a side plate 216. The side plate 216 may be entirely made of silicon carbide. The side wall 214 therefore has a side face 214A in abutment with the first face 218B of the rotor housing 218. The side plate 216 has a rotor-engaging face 216A facing the rotor cavity 20. The second side housing, although depicted with a dashed line in FIG. 7, may have the same features as the side housing 211 described above. The rotor cavity 20 is therefore bounded axially between the two side housings.

In the embodiment shown, to at least partially alleviate the aforementioned drawbacks of the aluminum, the side wall 214 has a side main body 214B made of a base material, such as aluminum, and a side external layer 214C made of an external material. The side external layer 214C defines the side face 214A that is abutting the rotor housing 218. Also, the rotor housing 218 has a peripheral main body 218D made of the base material, and peripheral external layers 218E located on opposite sides of the peripheral main body 218D, and made of the external material. The peripheral external layers 218E define the first face 218B and the second face 218C of the rotor housing 218. In some embodiments, the rotor housing 218 may include a peripheral inner external layer 218F made of the external material. However, in some embodiments, the peripheral inner face 218A is preferably coated via thermal spray to resist abrasive wear with the apex seals of the rotor 24. The peripheral inner external layer 218F defines the peripheral inner face 218A of the rotor housing 218 and the surface against which the rotor 24 rides during operation. A thickness of the different external layers 214C, 218E, 218F may be about at least 0.010 inch. The thickness may be from about 0.010 inch to about 0.125 inch. In the context of the present disclosure, the expression "about" implies variations of plus or minus 10%. It will be appreciated that the external layer need not define an entirety of the different faces, but that only at least a part of those faces may be defined by the external layer in some embodiments.

A wear-resistance of the external material is greater than that of the base material. The expression "wear-resistance" may imply that a hardness of the external material is greater than a hardness of the base material. Wear-resistance as understood in the current disclosure refers to an ability of a material to resist wear either by friction with the rotor 24, by friction with the side housings 211, or any combinations of the above. In the depicted embodiment, the base material is aluminum and the external material is steel.

The base material and the external material are dissimilar of one another. In the context of the present disclosure, the expression "dissimilar" when referring to materials implies materials that are difficult to join together, either because of their respective chemical composition or because of large differences in physical properties of these materials being joined. In other words, "dissimilar materials" refer to materials that are distinct or different from each other in terms of their composition, properties, or characteristics. These materials may have varying physical, chemical, or mechanical properties. The dissimilarity between materials affects their behavior when they come into contact or are used together in a system.

In the embodiment shown, the base material and the external material are joined together via a bonding layer. The bounding layer includes the base material at an intersection with the main body. For instance, the side wall 214 has the side main body 214B and the side external layer 214C joined to the side main body 214B via a side bounding layer 214D. Similarly, the rotor housing 218 has the peripheral main body 218D and the peripheral external layers 218E joined to the peripheral main body 218D via peripheral bounding layers 218G. In some embodiments, the peripheral inner external layer 218F is joined to the peripheral main body 218D via a peripheral inner bounding layer 218H.

Figure 8:
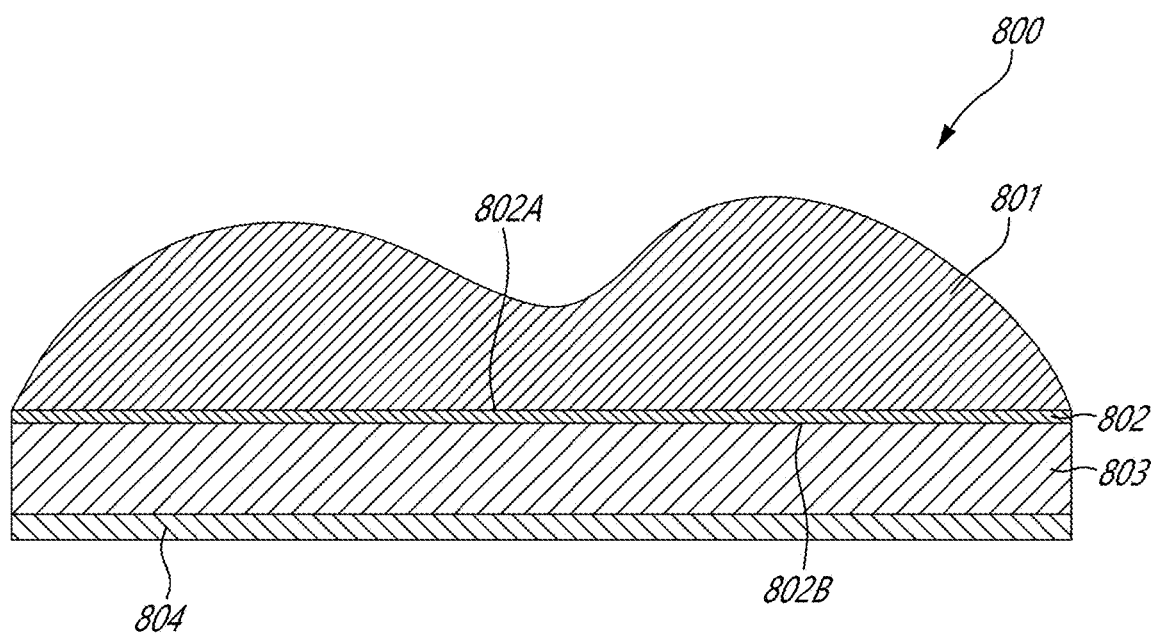
FIG. 8 is a cross-sectional view of a portion of the housing assembly.

Referring more particularly to FIG. 8, a portion 800 of a housing of the rotary internal combustion engine 10 is illustrated and described below using reference numerals in the 800's. This portion may belong to any of the side housing 211 and the rotor housing 218. The portion 800 includes a main body 801 made of a base material; a bounding layer 802 including the base material at an intersection with the main body 801; and an external layer 803 made of an external material. The external layer 803 is secured to the main body 801 via the bounding layer 802. As explained above, the base material and the external material are dissimilar to one another. A wear-resistance of the external material is greater than that of the base material. The external layer 803 defines a face either exposed to the combustion chambers of the engine, in contact with another component of the housing, or both.

The main body 801 represents a major portion of the housing (e.g., side housing, rotor housing). Herein, the expression "major" implies 50% or more of a weight said housing. In other words, the main body 801 constitutes the bulk of the housing and defines its general shape. The external layer accounts for a remainder of the housing.

The bounding layer 802 includes a first face 802A facing the main body 801 and a second face 802B opposite the first face 802A and facing the external layer 803. The first face 802A of the bounding layer 802 is defined by the same material as the base material of the main body 801. For instance, the base material may be aluminum and the first face 802A of the bounding layer 802 is defined by aluminum. The external material may be one of steel, cast iron, tungsten carbide, silicon carbide, and titanium. The base material may be magnesium in some embodiments. For the case of steel, the second face 802B of the bounding layer 802 may also be made of the base material (e.g., aluminum). In some embodiments, the bounding layer 802 may include two sub-layers: a first sub-layer defining the first face 802A made of the base material (e.g., aluminum), and a second sub-layer contacting the external layer 803 and made of an alloy suitable to be bonded to the external material. The second sub-layer may be made, for instance, of copper.

In some embodiments, a hard coating 804 may be disposed over the external layer 803 on a face facing away from the bounding layer 803. The hard coating 804 may include one or more of silicon carbide, chromium carbide, aluminum nitride, and tungsten carbide or any other suitable hard coating. In such a case, the hard coating 804 is the face being in contact with another housing or exposed to combustion gases.

Figure 9:
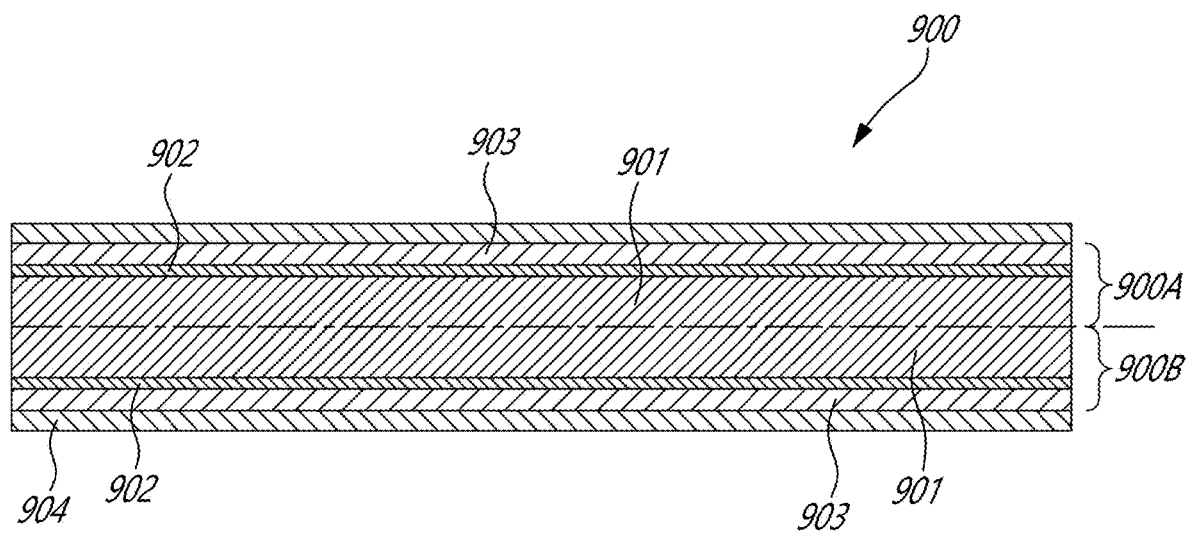
FIG. 9 is a cross-sectional view of a side plate.

Referring to FIG. 9, an embodiment of a side plate for the side wall 214 is shown at 900. In the embodiment shown, the side plate 900 includes two halves 900A, 900B. It will however be appreciated that the two halves 900A, 900B need not be mirror images of one another, although they are in this embodiment. Each of the two halves 900A, 900B includes a main body or core 901 made of the base material, a bonding layer 902 as described above, and an external layer 903 made of the external material being more wear-resistant than the base material. The cores 901 of each of the two halves 900A, 900B may be secured together via any suitable technique (e.g., friction welding, etc). In this embodiment, both opposite faces of the side plate 900 may be defined by the external material. A hard coating 904 may be applied on top on one or both of these opposite faces as described above.

Referring to FIG. 10, a method of manufacturing a component of the housing of the rotary engine is shown at 1000. The component may be, for instance, the side wall, the side plate, and/or the rotor housing.

The method 1000 includes obtaining a body of the component of the housing at 1002. The body has a first face and a second face opposite to the first face. The second face faces away from the rotor cavity. The body made of a first material, which may be steel for instance. Then, the method 1000 includes performing a treatment to the body to increase the wear-resistance of the first material at 1004. Then, a bonding layer is deposited on the second face of the body at 1006. As previously explained, the bonding layer includes a second material being dissimilar from the first material. The first material is more wear-resistant than the second material. The second material defines an exposed face of the bonding layer facing away from the body. Then, the method 1000 includes completing a shape of the body by bonding a quantity of a third material to the exposed face of the bonding layer to obtain the component of the housing at 1008.

In some embodiments, the bonding of the quantity of the third material at 1008 includes bonding the quantity of the third material with one or more of additive manufacturing and casting.

In some embodiments, the depositing of the bonding layer at 1006 includes depositing the bonding layer with ultrasonic additive manufacturing. Any other suitable methods may be used.

In some embodiments, the performing of the treatment at 1004 includes one or more of: performing a heat treatment to the body; performing a surface treatment to the outer face of the body; and depositing a hard coating on the outer surface of the body. The depositing of the hard coating may include deposing the hard coating including one or more of silicon carbide, chromium carbide, aluminum nitride, and tungsten carbide. The performing of the surface treatment may include performing one or more of laser hardening, shot peening, and thermal spraying.

In some embodiments, the obtaining of the body at 1002 includes obtaining the body made of one or more of steel, cast iron, tungsten carbide, silicon carbide, and titanium. The bonding of the quantity of the third material may include bonding aluminum to the external material via the bonding layer.

The method 1000 may further comprise performing finishing steps to third material after the bonding of the quantity of the third material. These finishing steps may include, for instance, grinding, machining, and so on.

In some embodiments, the component is the side plate the side housing. The method 1000 thus may include obtaining two bodies made of the first material. The depositing of the bonding layer may include depositing a bonding layer on both of the two bodies and the bonding of the quantity of the third material may include bonding the quantity of the third material on both of the two bodies to obtain two sections of the side plate. At which point, the two sections may be joined together to obtain the side plate.

In some embodiments, the third material is the same as the second material. That is, the quantity of the third material added to the bonding layer may be the same material as defined by the exposed face of the bonding layer, such as aluminum.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of manufacturing a component of a housing defining a rotor cavity for receiving a rotor of a rotary internal combustion engine, the method comprising:
   obtaining a body of the component of the housing, the body having a first face and a second face opposite to the first face, the second face facing away from the rotor cavity, the body made of a first material;
   performing a treatment to the body to increase a wear-resistance of the first material;
   depositing a bonding layer on the second face of the body, the bonding layer including a second material being dissimilar from the first material, the first material being more wear-resistant than the second material, the second material defining an exposed face of the bonding layer facing away from the body; and
   completing a shape of the body by bonding a quantity of a third material to the exposed face of the bonding layer.

2. The method of claim 1, wherein the bonding of the quantity of the third material includes bonding the quantity of the third material with one or more of additive manufacturing and casting.

3. The method of claim 1, wherein the depositing of the bonding layer includes depositing the bonding layer with ultrasonic additive manufacturing.

4. The method of claim 1, wherein the performing of the treatment includes one or more of:
   performing a heat treatment to the body;
   performing a surface treatment to the first face of the body; and
   depositing a hard coating on the first face of the body.

5. The method of claim 4, wherein the performing of the treatment includes depositing a hard coating on the first face of the body, wherein the depositing of the hard coating includes deposing the hard coating including one or more of silicon carbide, chromium carbide, aluminum nitride, and tungsten carbide.

6. The method of claim 4, wherein the performing of the treatment includes performing a surface treatment to the first face of the body, wherein the performing of the surface treatment includes performing one or more of laser hardening, shot peening, and thermal spraying.

7. The method of claim 1, wherein the obtaining of the body includes obtaining the body made of one or more of steel, cast iron, tungsten carbide, and silicon carbide.

8. The method of claim 1, wherein the bonding of the quantity of the third material includes bonding aluminum to the third material via the bonding layer.

9. The method of claim 1, further comprising performing finishing steps to the third material after the bonding of the quantity of the third material.

10. The method of claim 1, wherein the component is a side plate, the obtaining of the body includes obtaining two bodies made of the first material, the depositing of the bonding layer includes depositing a bonding layer on both of the two bodies, the bonding of the quantity of the third material includes bonding the quantity of the third material on both of the two bodies to obtain two sections of the side plate, and joining the two sections together to obtain the side plate.

11. The method of claim 1, wherein the third material is the same as the second material.

* * * * *